United States Patent [19]

Chang

[11] Patent Number: 4,879,167

[45] Date of Patent: Nov. 7, 1989

[54] REAL TIME HOLOGRAPHIC FILTER USING NONLINEAR OPTICAL MATERIALS

[75] Inventor: Byung J. Chang, Ann Arbor, Mich.

[73] Assignee: Kaiser Optical System, Inc., Ann Arbor, Mich.

[21] Appl. No.: 89,082

[22] Filed: Aug. 25, 1987

[51] Int. Cl.$^4$ .................... B32B 9/00; B32B 17/10; G02B 5/18

[52] U.S. Cl. .................... 428/215; 428/428; 428/441; 428/522; 427/165; 430/321

[58] Field of Search ............... 428/215, 428, 441, 522

[56] References Cited

U.S. PATENT DOCUMENTS 4,531,809 7/1985 Carter et al. .................... 430/321
4,741,962 5/1988 Wada et al. .................... 428/428

FOREIGN PATENT DOCUMENTS 0246508 12/1985 Japan .................... 428/428

Primary Examiner—P. C. Ives
Attorney, Agent, or Firm—Krass & Young

[57] ABSTRACT

The present invention is an adaptive laser protection device which adaptively forms a reflection holographic optical element to reflect away incident laser radiation. The laser protection device includes a layer of a nonlinear optical material which has an index of refraction varying with light intensity, a transparent layer having a depth greater than the coherence length of the expected ambient illumination and less than the coherence length of the expected laser radiation, and a partially reflecting layer on the far surface of the transparent layer. Laser radiation incident on the laser protection device forms an interference pattern in the nonlinear optical material between directly incident light and light reflected from the partially reflecting layer. This interference pattern within the nonlinear optical material causes the formation of a holographic optical element due to varying indices of refractions. The geometry of the holographic optical element substantially reflects away the incident laser radiation protecting the user. The preferred embodiment includes a transparent substitute for supporting the device and an optical filter to limit incident light to a predetermined band.

13 Claims, 1 Drawing Sheet

REAL TIME HOLOGRAPHIC FILTER USING NONLINEAR OPTICAL MATERIALS

FIELD OF THE INVENTION

The technical field of the present invention is that of optical filters for laser protection.

BACKGROUND OF THE INVENTION

Due to recent advances in the technology of laser generation and detection, laser systems for use in battlefield conditions have become more and more prevalent. These laser systems are employed for target illumination and tracking or for ranging. In a particular battlefield setting, there may be numerous laser illuminators operating simultaneously. These laser illuminators may be both from friendly forces and from enemy forces. In particular, combat troops operating in this environment will be subject to uncontrolled illumination by laser radiation. Because of the great radiated power from these laser radiation sources, these personnel require some manner of eye protection from this laser illumination. Furthermore, the modern battlefield also includes numerous optical sensors. Some of these sensors are associated with the above mentioned laser sources. Other sensors, such as those associated with infrared night vision systems, are independent of laser sources. These optical sensors likewise need protection from uncontrolled laser illumination.

Three types of laser protection are known in the prior art. The first type includes heavily tinted spectacles. The color of these tinted spectacles covers the bandwidth of the expected laser illumination. The laser light is absorbed by the tint in the spectacle, thereby reducing the light intensity reaching the eye within the wavelength band of the tint.

A second type of solution to this problem is the use of holographic optical elements. Holographic optical elements include three-dimensional interference fringe patterns which diffract light at specified wavelengths. Holographic optical elements are ordinarily constructed employing laser light forming interference fringes within the volume of a photosensitive medium. Upon development of the photosensitive medium, the pattern of interference fringes is fixed within this medium in form of varying indices of diffraction. When light of certain wavelengths enters such a holographic optical element, it is diffracted by this interference fringe pattern. In the case of laser protection eyewear, it is common to form a reflection holographic optical element which diffracts incoming radiation at the particular wavelength in a manner making it appear to be a mirror.

These laser eye protection techniques provide some protection for laser sources having known fixed wavelengths. In some instances it is easy to predict the particular wavelength to be employed because there are only a limited number of laser sources having a limited number of wavelengths. However, in the near future it is expected that multi-wavelength agile lasers will be employed in such battlefield situations. The advent of such multi-wavelength agile lasers complicates the strategies required to protect the eyes from laser radiation because of the increasing number or width of the attenuation bands required to cover all possible wavelengths will result in unacceptable degradation of visible transmission.

The third type of solution to the problem of laser protection is specifically directed to adaptive response to such multi-wavelength agile lasers. Several dynamic laser protection systems have been proposed which employ photodetector-actuated shutters which may be either mechanical, electro-optical or magneto-optical, or photoreactive filters such as formed of photochromatic materials. Such devices currently known are not completely satisfactory because they are cumbersome and they are slow in response. Known dynamic photo devices are not capable of achieving significant optical densities within 10 microseconds whereas the duration of a typical Q-switched laser pulse is approximately 20 nanoseconds. Therefore, currently known adaptive laser protection systems provide inadequate protection.

In view of the expected laser light environment in the modern battlefield a number of characteristics for laser protection would be advantageous. Firstly, this laser protection must be responsive to only the wavelengths of intense laser radiation. It should be able to respond extremely rapidly to any such intense laser radiation. The optical density, that is the blocking power, is ideally proportional to the intensity of the laser radiation. It would be advantageous that the attenuation bands of such laser protection in wavelength and angle be narrow enough to provide clear vision under all other conditions of illumination. Lastly, it would be advantageous if such a device were passive, that is not requiring any external power source.

SUMMARY OF THE INVENTION

The present invention is a form of laser protection which dynamically adapts to incident laser radiation. This enables the laser protection of the present invention to provide protection to multiple wavelength and multi-wavelength agile lasers which provide threats on multiple wavelengths. In accordance with the present invention a reflection holographic optical element is formed in real time for reflection of the incident laser radiation. This formation takes place in a layer of nonlinear optical material whose refractive index refraction varies in accordance with the intensity of the laser radiation.

In accordance with the present invention the laser protection device is disposed between the laser threat and the eye of the user or the optical sensor. Incident laser radiation passes through a layer of nonlinear optical material and is partially reflected at a partially reflecting layer at the side of the device toward the eye. This reflected light interferes with the incoming directly incident light in the nonlinear optical material. This interference forms interference fringes of varying intensity within the nonlinear optical material. In accordance with the optical characteristics of this nonlinear optical material, differing indices of refraction are formed corresponding to the differing intensities of light. This pattern of differing indices of refraction forms a holographic optical element. Because of the geometry of formation of this holographic optical element it serves as a reflective holographic optical element and substantially reflects the incident laser radiation. Thus the present invention forms an adaptive laser illumination filter which substantially reflects incident laser radiation.

BRIEF DESCRIPTION OF THE FIGURE

The objects and aspects of the present invention will become clear from the following description taken in conjunction with the figures in which.

DETAILED DESCRIPTION OF THE PREFERRED EMBODIMENT

Figure 1:
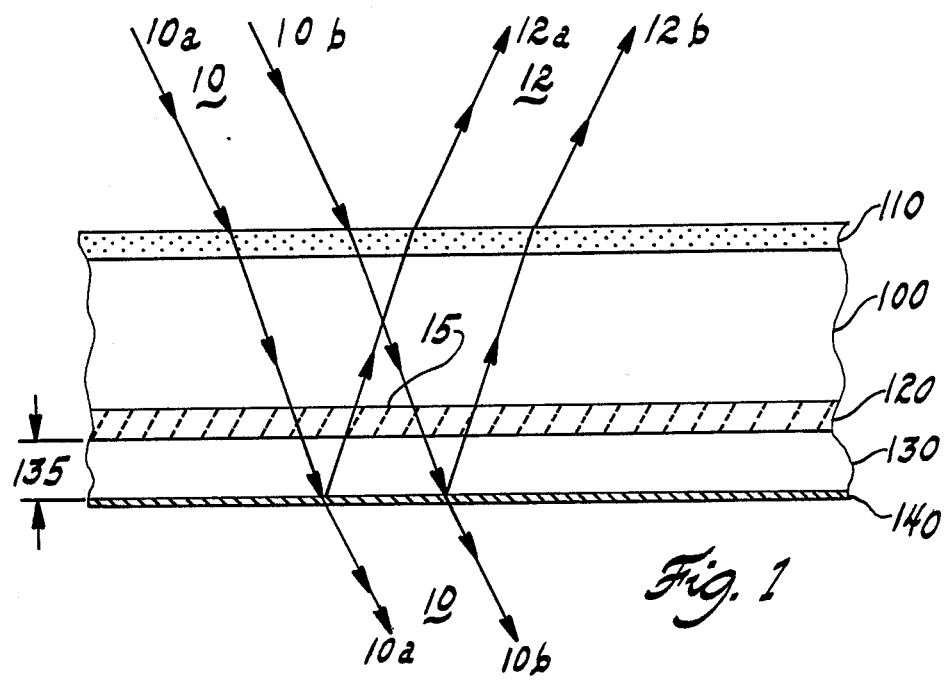
FIG. 1 illustrates the construction of a laser protection device in accordance with the present invention.

FIG. 1 illustrates the construction of the laser protection device in accordance with the present invention. FIG. 1 illustrates transparent supporting substrate 100 having mounted on one surface thereof an optical filter layer 110, and on the other surface thereof a layer of nonlinear optical material 120. Disposed adjacent to the other surface of nonlinear optical material 120 is an optical path length control layer 130. Disposed on the far surface of this optical path length control layer 130 is a partially reflecting layer 140.

FIG. 1 illustrates incident light rays 10a and 10b which form the illuminating rays of a beam of incoming laser radiation. Each of incident rays 10a and 10b enter the surface of the device at the exterior surface of optical filter layer 110, and are slightly refracted. In addition, these incoming rays may be partially reflected at this layer, however the present application does not concern these reflections and they are not illustrated in FIG. 1. These incident light beams pass through optical filter layer 110, transparent supporting substrate 100, nonlinear optical layer 120 and optical path length control layer 130 and become incident upon partially reflecting layer 140. In accordance with the characteristics of partially reflecting layer 140 light beams 10a and 10b are partially transmitted (as illustrated at the continuation of rays 10a and 10b) and are partially reflected becoming rays 12a and 12b.

Optical filter layer 110 is constructed to substantially block incoming radiation which is outside of a predetermined band. For eye protection optical filter layer 110 is constructed to form a pass band filter having a pass band for wavelengths between approximately 400 nanometers and approximately 700 nanometers. It is believed that the visible light within this pass band of 400 nanometers to 700 nanometers in wavelength will provide adequate visual see-through transmission. In the case of use of this invention for the protection of optical sensors the pass band would correspond to the operational band of the optical sensor. Optical filter layer 110 may include a dye filter layer constructed to absorb light outside the pass band. This optical filter layer 110 is incorporated in the combination in order to prefilter the light reaching nonlinear optical layer 120 which neednot be responsive to incident laser illumination outside this predetermined band. The optical filter layer 110 may also include one or more band limiting or notch filters constructed according to the prior art from holographic optical elements or dielectric filters. These blocking portions of optical filter layer are preferably located to counter a known laser threat wavelength. They should provide attenuation of a relatively narrow range of bandwidths near a corresponding center wavelength.

Figure 2:
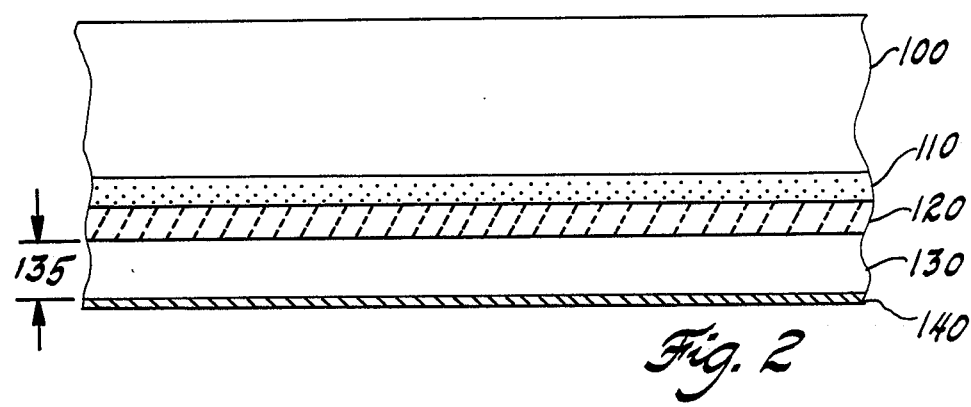
FIG. 2 illustrates a first alternative construction of the laser protection device of the present invention.
Figure 3:
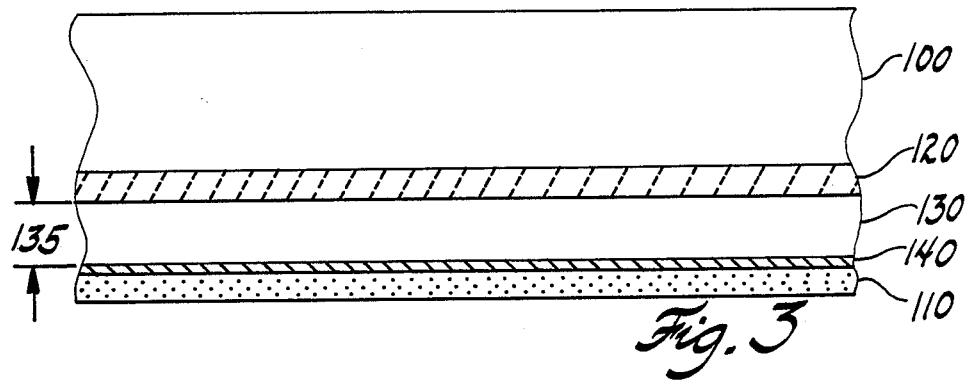
FIG. 3 illustrates a second alternative construction of the laser protection device of the present invention.

FIGS. 2 and 3 illustrate alternative locations for the optical filter layer 110. In FIG. 2 optical filter layer 110 is illustrated as disposed on the opposite surface of transparent supporting substrate 100, between transparent supporting substrate 100 and the nonlinear optical layer 120. FIG. 3 illustrates optical filter layer 110 disposed on the surface of partially reflecting layer 140 opposite to optical path length control layer 130. As seen in FIGS. 1 to 3, optical filter layer 110 may be provided in various positions in the optical path. The essential feature is that optical filter layer 110 be disposed in some location in the optical path from the laser source to the protected eye or optical sensor and that the distance 135 between nonlinear optical layer 120 and partially reflecting layer 140 is preserved. In addition, it can be readily appreciated that a plurality of optical filter layers 110 may be provided at the various locations illustrated in FIGS. 1 to 3.

Optical filtering characteristics may also be embodied in either transparent supporting substrate 100 or optical path length control layer 130. If an optical filtering characteristic is incorporated within transparent supporting substrate 100, this layer must be constructed with sufficient mechanical strength to support the laser protection device. If optical filtering characteristic is incorporated within optical path control layer 130, this layer must have the thickness 135 which is greater than the coherence length of the expected ambient illumination but less than the coherence length of the expected laser illumination.

Transparent supporting substrate 100 is formed of any suitable material having the mechanical strength to support the rest of the laser protection device. In accordance with the prior art transparent supporting substrate 100 could be formed of glass or transparent plastic. The essential function of transparent supporting substrate 100 is to provide the requisite mechanical stability for the device.

Nonlinear optical layer 120 is formed on the interior surface of transparent supporting substrate 100. This layer is formed of a nonlinear optical material which has an index of refraction which varies in accordance to the intensity of radiation. Such nonlinear optical materials constructed of organic polymeric systems are known in the art. In accordance with the preferred embodiment of the present invention this layer is formed of polydiacetylenes (PDAs). Polydiacetylenes have a large third order nonlinear optical susceptibility which is proportional to the intensity dependent index of refraction. The response time of the nonlinearity of this material is believed to be in the range of less than 1 picosecond. This response time is believed adequate to respond to the typical Q-switched laser pulse which has a duration of the order of 20 nanoseconds.

After the light passes through the nonlinear optical layer 120 it passes through optical path length control layer 130. The depth 135 of optical path length control layer 130 is selected to be greater than the coherence length of the expected ambient light but less than the coherence length of the expected laser illumination. In a typical use of the laser protection device of the present invention the ambient illumination would be sunlight. Sunlight has a very short coherence length, that is a very short length during which the light is coherent enough to interfere with itself. On the other hand, the expected laser illumination would have a coherence length expected in the range of greater than several millimeters. Therefore, there should be relatively broad range of depths 135 which can be employed for optical path length control layer 130. The reason for selection of this particular depth 135 will be further explained below.

After incident radiation passes through optical path length control layer 130 it reaches partially reflecting layer 140. Partially reflecting layer 140 reflects some of the incident light and transmits the rest of the incident light. The reflected incident light passes back through optical path length control layer 130, nonlinear optical layer 120, transparent supporting substrate 100 and optical filter layer 110. The light transmitted by partially reflecting layer 140 continues on and eventually reaches the eye of the user or the optical sensor. Due to the reflection of incident light via partially reflecting layer 140 there exists a region 15 in which the incoming beam 10 crosses the reflected beam 12. If this incident radiation is light of a relatively low coherence length, such as ordinary sunlight or other forms of ambient illumination, the path length from nonlinear optical layer 120 through optical path length control layer 130, reflected from partially reflecting layer 140 back to nonlinear optical layer 120 is greater than the coherence length of this radiation. Therefore, no interference fringes are formed in region 15 within nonlinear optical layer 120. In the case of incident laser radiation, however, the coherence length of this radiation is many times greater. It is believed that the depth 135 of optical path length control layer 130 can be selected so that the round-trip path from reflecting layer 140 can be less than the coherence length of this laser radiation but greater than the coherence length of ambient radiation. In this event, incident laser radiation forms interference fringes in the region 15 including the region of nonlinear optical layer 120, whereas other ambient light does not form such interferences.

The interference fringes formed within nonlinear optical layer 120 form a pattern of alternating light intensities. Because of the nonlinear characteristics of nonlinear optical layer 120, this pattern of alternating light intensities causes a similar pattern of alternating indices of refraction.

This pattern of alternating of indices of refraction forms a holographic optical element within nonlinear optical layer 120. Because of the manner of construction of this holographic optical element, it serves as a reflective holographic optical element, substantially reflecting laser illumination on the construction wavelength. Because this incident laser illumination is the same laser illumination which is employed to form the interference fringes, the structure of the present invention illustrated in FIG. 1 adaptively forms a reflective filter to reflect incident laser radiation. Due to the rapid response of the nonlinear optical layer 120, this adaptive holographic optical element is formed prior to the transmission of substantial amounts or energy through the laser protection device. This holographic optical element continues to be formed in the nonlinear optical layer 120 until the incident laser radiation is interrupted. At that time, due to the rapid response of the nonlinear optical material of nonlinear optical layer 120, the interference fringes of alternating indices of refraction rapidly relax and the nonlinear optical layer 120 becomes uniform again.

Because the incident laser radiation forms the interference fringes in the nonlinear optical layer 120, the holographic optical element thus formed is precisely formed for reflection of that particular wavelength at that particular incident angle. Therefore the present invention forms an ideal adaptive laser protection filter device.

There are several ways to use a laser protection device such as described above. The structure illustrated in FIG. 1 could be embodied in goggles, glasses or visors for placement before the eyes of the user. Alternatively a window, such as a vehicle window or windshield, could be constructed in this manner. The essential feature is to place the laser protection structure illustrated in FIG. 1 between the threat illumination and the eye of the user or the optical sensor.

I claim:

1. A laser protection device for protection against laser illumination having a coherence length exceeding a minimum expected coherence length, said laser protection device comprising:
   a layer of a nonlinear optical material having an index of refraction dependent upon light intensity;
   a layer of transparent optical material having a first surface disposed adjacent to said layer of nonlinear optical material and a second opposed surface, and having a thickness greater than the coherence length of the expected ambient light but less than the minimum expected coherence length of the laser illumination; and
   a partially reflecting layer disposed on said second surface of said layer of transparent optical material for partially reflecting and partially transmitting incident light.

2. The laser protection device as claimed in claim 1, further comprising:
   a transparent substrate for supporting said layer of nonlinear optical material, said laser of transparent optical material and said partially reflecting layer.

3. The laser protection device as claimed in at least one optical filter layer disposed in a manner supported by said transparent substrate for blocking incident radiation outside a predetermined pass band.

4. The laser protection device as claimed in claim 3, wherein:
   said predetermined pass band of said optical filter layer includes wavelengths from approximately 400 nm to approximately 700 nm.

5. The laser protection device as claimed in claim 3, wherein:
   said optical filter layer further includes at least one attenuation filter for blocking incident radiation within band of wavelengths around a corresponding center wavelength, said center wavelength and said band of wavelengths corresponding to the center wavelength and bandwidth of expected laser illumination.

6. The laser protection device as claimed in claim 3, wherein:
   said transparent substrate includes first and second opposed surfaces;
   said at least one optical filter layer includes a single optical filter layer disposed on said first surface of said transparent substrate; and
   said layer of nonlinear optical material is disposed on said second surface of said transparent substrate for support.

7. The laser protection device as claimed in claim 3, wherein:
   said at least one optical filter layer includes a single optical filter layer having a first surface disposed on said first surface of said transparent substrate and a second opposed surface; and said layer of nonlinear optical material is disposed on said second surface of said optical filter layer.

8. The laser protection device as claimed in claim 3, wherein:
said transparent substrate includes a first surface;
said layer of nonlinear optical material is disposed on said first surface of said transparent substrate;
said partially reflecting layer includes a first surface disposed adjacent to said second surface of said layer of transparent optical material and a second opposed surface; and
said at least one optical filter layer includes a single optical filter layer disposed on said second surface of said partially reflecting layer.

9. The laser protection device as claimed in claim 1, wherein:
said layer of nonlinear optical material includes polydiacetylenes.

10. A laser protection device for protection against laser illumination having a coherence length exceeding a minimum coherence length, said laser protection device comprising:
a layer of nonlinear optical material having an index of refraction dependent upon light intensity;
an optical filter layer having a first surface disposed adjacent to said layer of nonlinear optical material and a second opposed surface, and having a thickness greater than the coherence length of the expected ambient light but less than the minimum expected coherence length of the laser illumination, for blocking incident radiation outside a predetermined pass band; and
a partially reflecting layer disposed on said second surface of said layer of transparent optical material for partially reflecting and partially transmitting incident light.

11. The laser protection device as claimed in claim 10, wherein:
said predetermined pass band of said optical filter layer includes wavelengths from approximately 400 nm to approximately 700 nm.

12. A laser protection device for protection against laser illumination having a coherence length exceeding a minimum expected coherence length, said laser protection device comprising:
a layer of transparent optical material having a first surface disposed adjacent to said layer of nonlinear optical material and a second opposed surface, and having a thickness greater than the coherence length of the expected ambient light but less than the minimum expected coherence length of the laser illumination;
a partially reflecting layer disposed on said second surface of said layer of transparent optical material for partially reflecting and partially transmitting incident light; and
a supporting optical filter layer for supporting said layer of nonlinear optical material, said layer of transparent optical material and said partially reflecting layer, for blocking incident radiation outside a predetermined pass band.

13. The laser protection device as claimed in claim 12, wherein:
said predetermined pass band of said supporting optical filter layer includes wavelengths from approximately 400 nm to approximately 700 nm.

* * * * *

UNITED STATES PATENT AND TRADEMARK OFFICE
CERTIFICATE OF CORRECTION

PATENT NO. : 4,879,167
DATED : November 7, 1989
INVENTOR(S) : Byung J. Chang

It is certified that error appears in the above-identified patent and that said Letters Patent is hereby corrected as shown below:

Column 2, line 44, after "whose" delete --refractive--.

Column 2, line 44, after "index" insert --of--.

Col. 6, line 34, claim 3, after "claimed in" insert --claim 2, further comprising--.

Column 3, line 57, delete "neednot" and insert --need not--.

Column 5, line 54, delete "or" and insert --of--.

Signed and Sealed this

Twelfth Day of February, 1991

Attest:

HARRY F. MANBECK, JR.

*Attesting Officer*   *Commissioner of Patents and Trademarks*